US012746898B1

(12) United States Patent
Theodosakis et al.

(10) Patent No.: US 12,746,898 B1
(45) Date of Patent: Sep. 29, 2026

(54) CLOSED LOOP PULSE BRAKING USING IMU MEASUREMENTS

(71) Applicant: Textron Inc., Providence, RI (US)

(72) Inventors: Gregory August Theodosakis, Martinez, GA (US); Russell William King, Evans, GA (US); Kevin Douglas Grove, McCormick, SC (US)

(73) Assignee: TEXTRON INC., Providence, RI (US)

( * ) Notice: Subject to any disclaimer, the term of this patent is extended or adjusted under 35 U.S.C. 154(b) by 8 days.

(21) Appl. No.: 19/089,191

(22) Filed: Mar. 25, 2025

(51) Int. Cl.
*B60T 7/12* (2006.01)
*B60T 13/74* (2006.01)
*B60T 17/22* (2006.01)

(52) U.S. Cl.
CPC .............. *B60T 7/12* (2013.01); *B60T 13/748* (2013.01); *B60T 17/22* (2013.01); *B60Y 2200/86* (2013.01)

(58) Field of Classification Search
CPC .......... B60T 7/12; B60T 13/748; B60T 17/22; B60Y 2200/86
See application file for complete search history.

(56) References Cited

U.S. PATENT DOCUMENTS 12,071,119 B2 * 8/2024 King .......................... B60L 7/26

* cited by examiner

*Primary Examiner* — Xiao En Mo
(74) *Attorney, Agent, or Firm* — Foley & Lardner LLP

(57) ABSTRACT

A recreational vehicle includes an electromagnetic braking system, an inertial measurement unit (IMU), and a vehicle controller configured to identify a fault condition of the recreational vehicle. The vehicle controller also determines a target velocity trajectory to bring the vehicle to a controlled stop with an average deceleration less than a threshold. The vehicle controller determines a pulse signal for the electromagnetic braking system based on the target velocity trajectory and a current velocity. The period of the pulse signal includes a first time duration where the brake is engaged and a second time duration where the brake is released. The vehicle controller adjusts the first or second time duration based on a pitch measurement from the IMU before being applied to the electromagnetic braking system. If the vehicle is moving uphill the second time duration is increased. If the vehicle is moving downhill the first time duration is increased.

20 Claims, 9 Drawing Sheets

CLOSED LOOP PULSE BRAKING USING IMU MEASUREMENTS

CROSS-REFERENCE TO RELATED PATENT APPLICATION

This application is related to U.S. Pat. No. 12,071,119, granted on Aug. 27, 2024, the entire contents of which are herein incorporated by reference.

BACKGROUND

Recreational vehicles traverse hills of various grades. Recreational vehicles may include electromagnetically actuated brakes to stop vehicle motion.

SUMMARY

One embodiment relates to a recreational vehicle. The recreational vehicle includes an electromagnetic braking system with a brake, an inertial measurement unit, and a vehicle controller. The vehicle controller is configured to identify a fault condition of the recreational vehicle and determine a target velocity trajectory of the recreational vehicle, the target velocity trajectory associated with a deceleration from a velocity of the recreational vehicle at a time the fault condition is identified to a stop at average deceleration of the recreational vehicle less than a threshold deceleration. The vehicle controller is also configured to determine a pulse signal for the electromagnetic braking system based on the target velocity trajectory and a current velocity of the recreational vehicle. The period of the pulse signal includes a first time duration where the brake is engaged and a second time duration where the brake is released. The vehicle controller is also configured to adjust the first time duration or the second time duration based on a pitch measurement of the inertial measurement unit and apply the pulse signal to the electromagnetic braking system.

Another embodiment relates to a vehicle system. The vehicle system includes one or more memory devices having instructions stored thereon that, when executed by one or more processors, cause the one or more processors to perform operations. The operations include acquiring at least one of a vehicle speed measurement or a vehicle pitch measurement from an inertial measurement unit of a vehicle. The operations also include identifying a fault condition of the vehicle and generating a pulse signal for an electromagnetic braking system of the vehicle based on the at least one of the vehicle speed measurement or the vehicle pitch measurement to cause an average deceleration of the vehicle during a deceleration time period to be less than or equal to a threshold deceleration in response to the fault condition.

Still another embodiment relates to a vehicle. The vehicle includes an electromagnetic braking system with a brake, a speed sensor, an inertial measurement unit, and a vehicle controller. The vehicle controller is configured to identify a fault condition of the vehicle and determine a target velocity trajectory of the vehicle. The target velocity trajectory is associated with a deceleration from a velocity of the vehicle at a time the fault condition is identified to a stop at average deceleration of the vehicle less than a threshold deceleration. The vehicle controller is also configured to acquire a current velocity of the vehicle using the speed sensor and acquire the current velocity of the vehicle using the inertial measurement unit. The vehicle controller is also configured to determine a pulse signal for the electromagnetic braking system based on the target velocity trajectory and a current velocity of the vehicle. The period of the pulse signal includes a first time duration where the brake is engaged and a second time duration where the brake is released. The vehicle controller is also configured to increase a fraction of the period represented by the first time duration responsive to a pitch measurement of the inertial measurement unit indicating the vehicle is moving downhill, increase a fraction of the period represented by the second time duration responsive to a pitch measurement of the inertial measurement unit indicating the vehicle is moving uphill, and apply the pulse signal to the electromagnetic braking system.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
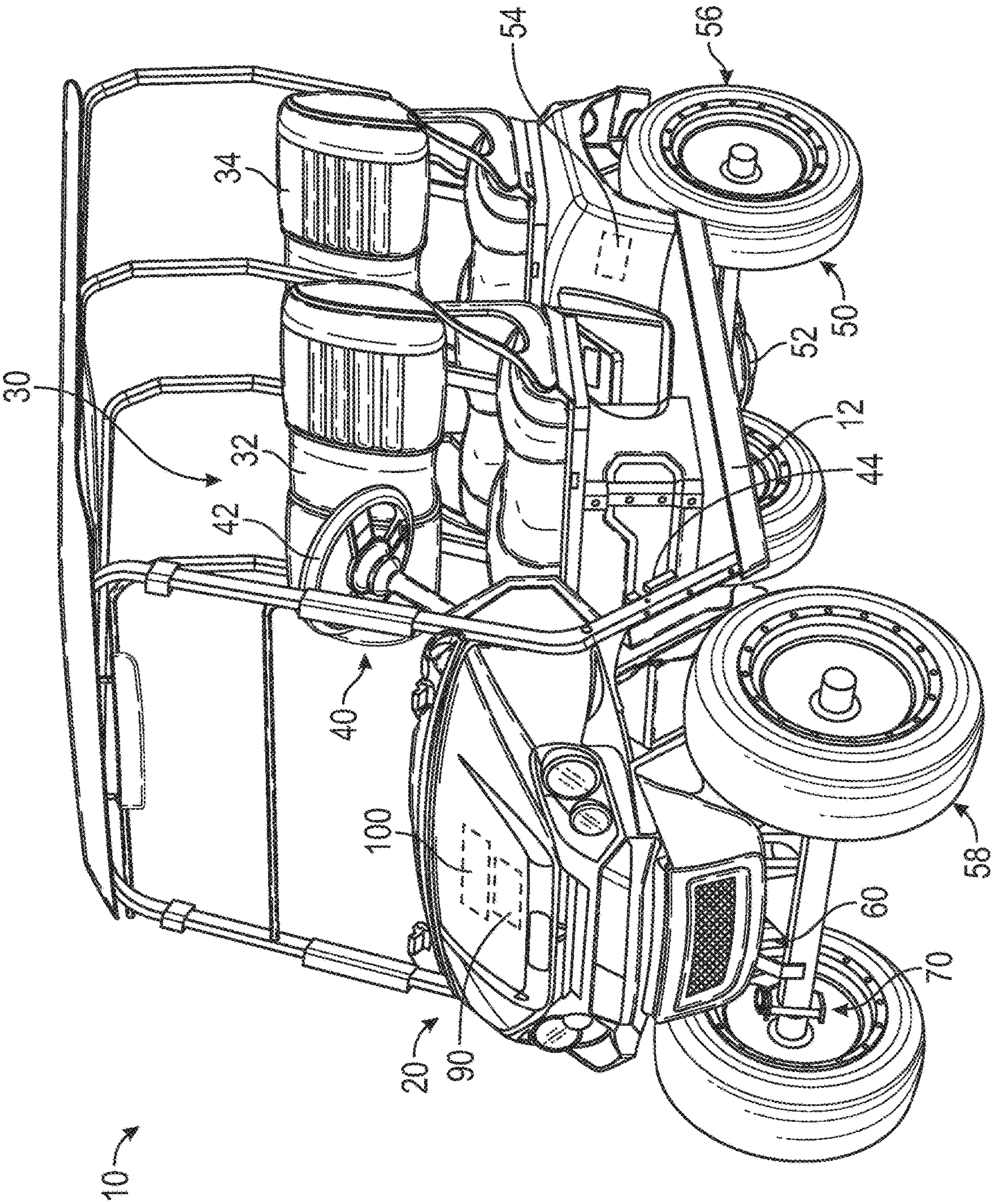
FIG. 1 is a perspective view of a vehicle, according to an exemplary embodiment.
Figure 2:
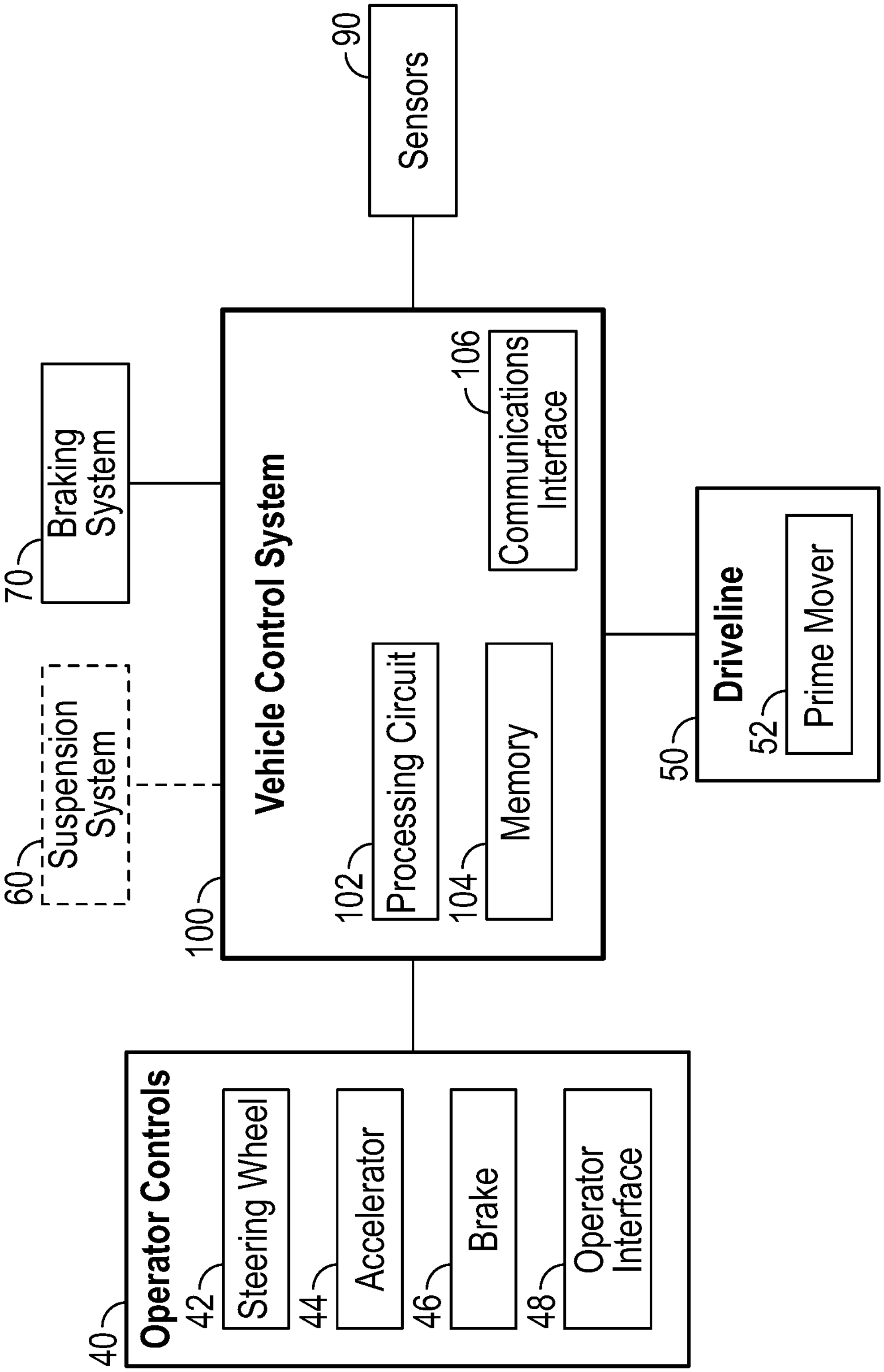
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart or vehicle, an all-terrain vehicle ("ATV"), a utility task vehicle ("UTV"), a low speed vehicle ("LSV"), a personal transport vehicle ("PTV"), a hauler, and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, another type of chore product that may be used on a golf course, a ground support equipment ("GSE") that may be used at an airport, and/or still other off-road machines or vehicles.

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input devices may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor (e.g., the motor 53) and the energy storage 54 is a battery system (e.g., the battery module 57, the add-on battery module(s) 59, etc.). In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, electric regenerative braking is employed (e.g., via the prime mover 52, an electric motor, etc.) in combination with or instead of using the braking system 70 to facilitate braking of one or more components of the driveline 50.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, a Doppler sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Electrified Driveline

Figure 3:
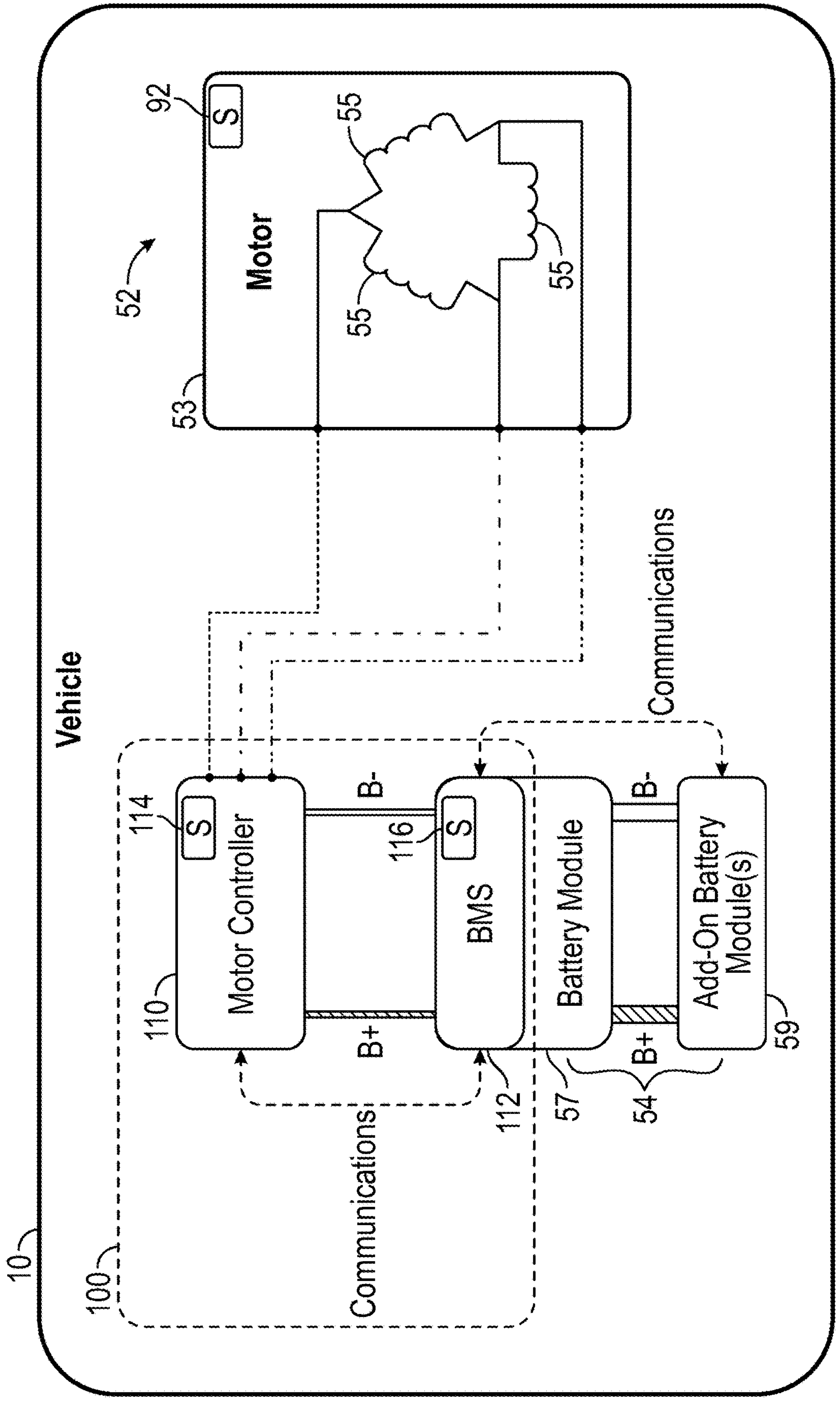
FIG. 3 is another schematic block diagram of the vehicle of FIG. 1, according to an exemplary embodiment.

According to the exemplary embodiments shown in FIG. 3, the driveline 50 of the vehicle 10 is configured as an electrified driveline where (a) the prime mover 52 is configured as a three-phase, alternating current ("AC") electric motor, shown as motor 53, including three sets of windings, shown as motor windings 55, and a first sensor, shown as motor sensor 92; (b) the energy storage 54 is configured as a battery system including a first battery pack or module, shown as battery module 57, and one or more second battery packs or modules, shown as add-on battery module(s) 59, electrically coupled to the battery module 57 in parallel; and (c) the vehicle control system 100 includes (i) a first controller, shown as motor controller 110, coupled to the motor 53 and including a second sensor, shown as motor controller sensor 114, and (ii) a second controller, shown as battery management system ("BMS") 112, coupled to the motor controller 110 and the energy storage 54 (e.g., the battery system, the battery module 57, the add-on battery module(s)

59, etc.) and including a third sensor, shown as BMS sensor 116. In some embodiments, the motor 53 is configured as a separately excited DC motor. The motor sensor 92, the motor controller sensor 114, and/or the BMS sensor 116 may include a temperature sensor, a voltage sensor, a current sensor, a speed sensor, and/or another suitable sensor to facilitate monitoring at least one of the operational parameters (e.g., temperature, voltage, current, speed, SOC, rate of charge, rate of discharge, etc.) of the motor 53, the motor controller 110, the BMS 112, the battery module 57, and/or the add-on battery modules(s) 59. The motor controller 110 and the BMS 112 may each include a processing circuit 102, a memory 104, and a communications interface 106.

According to an exemplary embodiment, each of the battery module 57 and the add-on battery module(s) 59 of the battery system includes one or more rows and/or groups of battery cells. The BMS 112 may be configured to monitor characteristics of the rows and/or groups of battery cells and/or individual cells of the battery module 57 and the add-on battery module(s) 59 (e.g., using data acquired by the BMS sensor 116) including, but not limited to, voltage, temperature, current, and state of charge ("SOC"). The BMS 112 may also be configured to provide direct current ("DC") power from the battery system to the motor controller 110 to power the motor 53 based on driving demands of the vehicle 10.

According to an exemplary embodiment, the motor controller 110 is configured to manage the power supplied to the motor 53. By way of example, the motor controller 110 may be configured to modulate the voltage, current, phase, and/or frequency of the power sent to the motor windings 55, which can influence the torque and speed output provided by the motor 53. In some embodiments, the motor controller 110 is configured to control a type of power, AC power or DC power, delivered to the motor 53. By way of example, the motor controller 110 may be configured to convert the type of power from DC power to AC power and/or regulate the AC power or DC power depending on the intended function of the motor 53. The motor controller 110 may include components to invert, convert, or otherwise modulate DC power and/or AC power.

As shown in FIG. 3, the energy storage 54 is configured to supply (e.g., via electrical wiring, electrical connections, etc.) DC power to the motor controller 110. In some embodiments, the DC power flows from the energy storage 54, through the BMS 112, and to the motor controller 110. The BMS 112 and the motor controller 110 may include communication interfaces (e.g., communications interfaces 106) that facilitate exchanging data related to operational status, command signals, and feedback therebetween. The BMS 112 and the add-on battery module 59 (e.g., a BMS thereof) may include communication interfaces that facilitate exchanging data related to operational status, command signals, and feedback therebetween. The add-on battery module(s) 59 is (are) configured to provide additional battery cells and increase the total energy storage capacity of the energy storage 54. As shown in FIG. 3, the battery module 57 and the add-on battery module(s) 59 are connected in parallel (e.g., via wires, connection busses, etc.) to provide for a pathway of electrical transfer. In other embodiments, the battery module 57 and the add-on battery module (s) 59 are connected in series.

According to an exemplary embodiment, the BMS 112 is configured to monitor (e.g., continuously, periodically, etc.) various parameters of the energy storage 54, including voltage, current, and temperature of each cell, rows/groups, and/or module within the energy storage 54. In some embodiments, the BMS 112 is configured to calculate or otherwise determine the SOC of the energy storage 54, the battery module 57, and/or the add-on battery module(s) 59. In some embodiments, the BMS 112 is configured to redistribute charge among the cells, rows/groups, and/or the modules to ensure an equal or substantially equal charge level throughout the energy storage 54. The BMS 112 can communicate with other systems or components or the vehicle 10 or with external devices (e.g., the remote systems 240) to report on battery status and diagnostics and/or to receive control commands.

According to an exemplary embodiment, the BMS 112 is configured to detect faults or failures in the energy storage 54 that may potentially lead to or that have caused an overcharge condition and, thereby, a thermal runaway event. By way of example, the BMS 112 may be configured to monitor the voltage of individual cells, rows/groups, or modules of the energy storage 54, and when deviations from normal voltage levels occur beyond a nominal range, the BMS 112 may determine that a fault or failure is present and that there is a potential for an overcharge condition or that there is an actual overcharge condition. In some implementations, the BMS 112 is configured to detect voltage imbalance or voltage imbalance trends. By way of another example, the BMS 112 may additionally or alternatively be configured to monitor current flows during charging and discharging of the energy storage 54 and identify unexpected fluctuations in current that may indicate that a fault or failure is present and that there is a potential for an overcharge condition or that there is an actual overcharge condition. By way of still another example, the BMS 112 may additionally or alternatively be configured to monitor the temperature of the cells, rows/groups, and/or modules of the energy storage 54 and identify anomalously high temperatures that may indicate that a fault or failure is present and that there is a potential for an overcharge condition or that there is an actual overcharge condition. It should be understood that the above example of detecting faults, failures, or overcharge conditions is provided for example purposes only and is not exhaustive. Other methods or techniques may be implemented to detect faults, failures, or overcharge conditions, which are intended to be included within the scope of the present disclosure. Additional details regarding fault detection regarding the energy storage 54 is described in greater detail herein. Further details regarding fault detection, including voltage imbalance, may be found in U.S. patent application Ser. No. 18/884,363, filed Sep. 13, 2024, which is incorporated herein by reference in its entirety.

Fleet Monitoring and Control System

Figure 4:
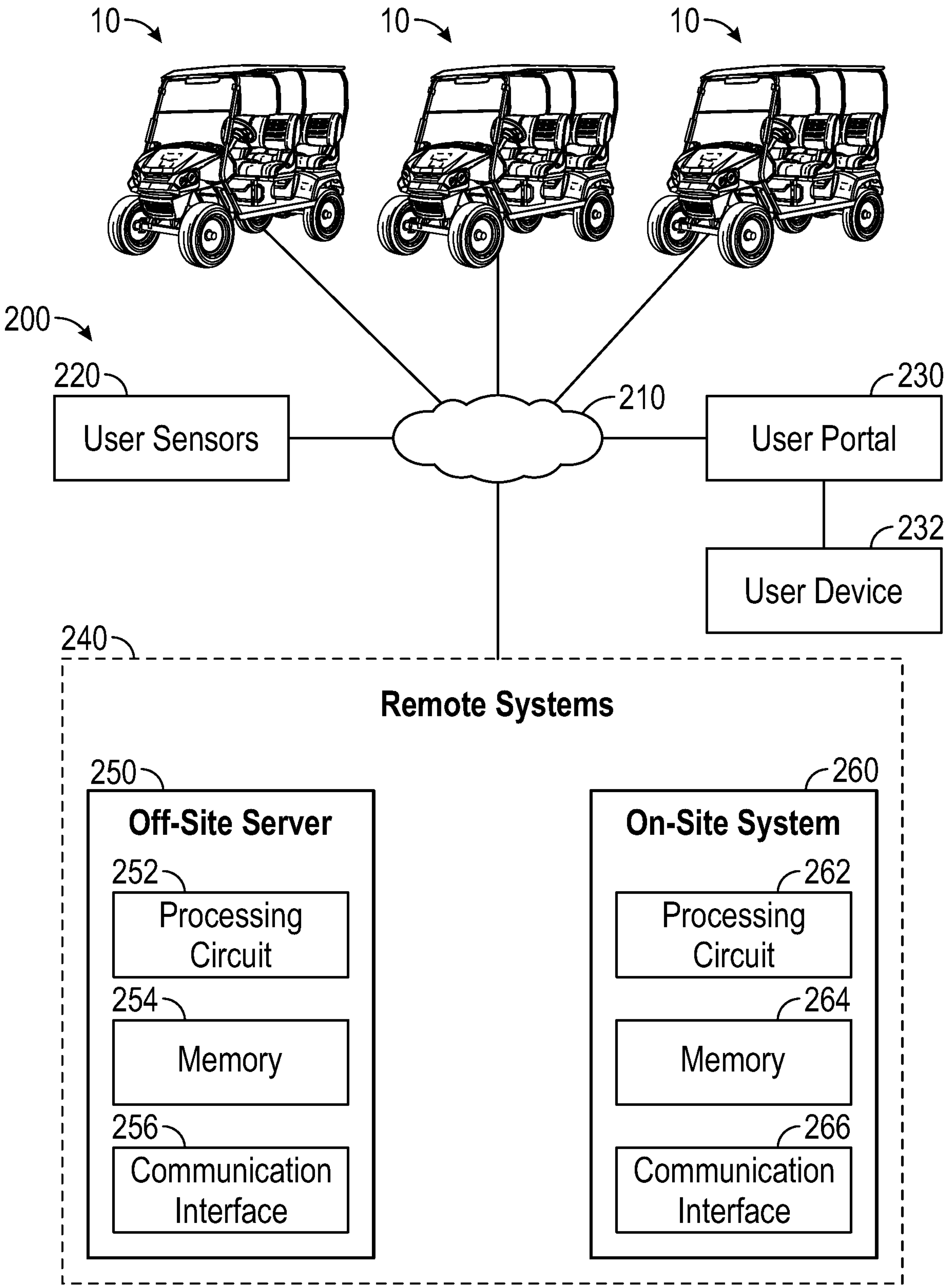
FIG. 4 is a schematic block diagram of a fleet monitoring and control system including a plurality of the vehicles of FIG. 1, according to an exemplary embodiment.

As shown in FIG. 4, a site monitoring and control system, shown as fleet monitoring and control system 200, includes one or more vehicles 10; one or more second sensors, shown as user sensors 220, positioned remote or separate from the vehicles 10; an operator interface, shown as user portal 230, positioned remote or separate from the vehicles 10; an external or remote user device, shown as user device 232, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210. In some embodiments, the fleet monitoring and control system 200 does not includes the user portal 230 and/or the user device 232.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, a heart rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, information available at the remote systems 240, etc. to manage and operate the site (e.g., golf course) such as for advanced scheduling purposes, to identify persons breaking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). As shown in FIG. 4, the user portal 230 is accessible via the user device 232. The user device 232 may be or include a computer, laptop, smartphone, tablet, or the like. The user portal 230 and the user device 232 may communicate via one or more communications protocols (e.g., Bluetooth, Wi-Fi, cellular, radio, through the Internet, wired connection, etc.) through a network (e.g., a CAN bus, the communications network 210, etc.). The user device 232 includes a display (e.g., a screen, etc.) configured to display one or more graphical user interfaces ("GUIs") of the user portal 230.

As shown in FIG. 4, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 4, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle control systems 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Pulsed Braking Using IMU Measurements

Figure 5:
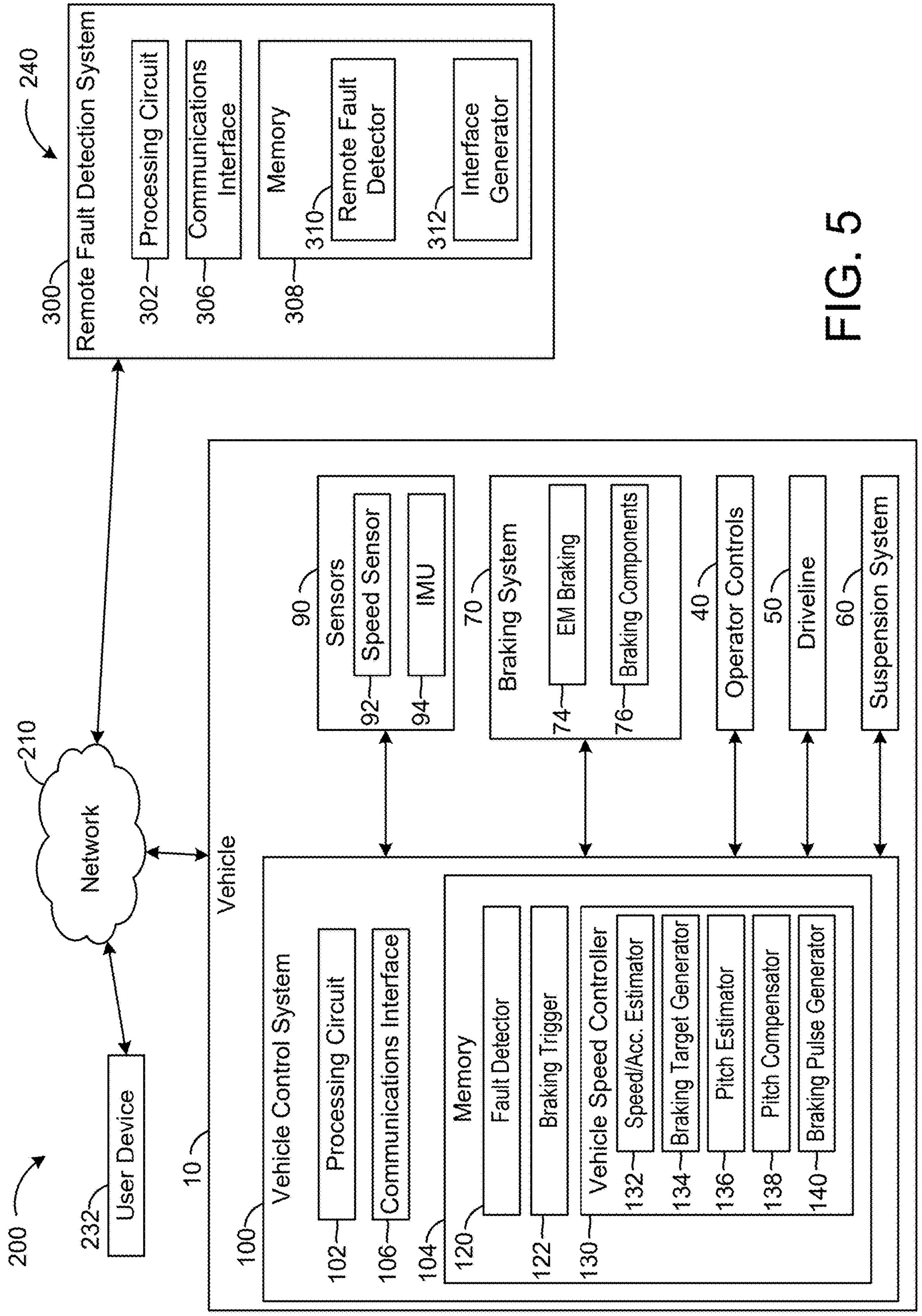
FIG. 5 is another schematic block diagram of the vehicle of FIG. 1 including communications to the fleet monitoring and control system of FIG. 4, according to an exemplary embodiment.

FIG. 5 shows the fleet monitoring and control system 200 with a detailed view of the vehicle 10. According to an exemplary embodiment, the vehicle 10 is configured to stop vehicle motion in response to a fault associated with the vehicle 10. Faults may be detected by the vehicle control system 100. Additionally or alternatively, faults associated with the vehicle 10 may be detected by an off-vehicle fault detection system, shown as remote fault detection system 300. In some embodiments, the remote systems 240 include the remote fault detection system 300. By way of example, the remote fault detection system 300 may be implemented by the off-site server 250 and/or the on-site system 260. In some embodiments, any of the features, components, or instructions included in the fault detection system 300 may be distributed across the vehicle control system 100, the on-site system 260, the off-site server 250, or any off-vehicle system included in the remote systems 240.

A fault detected by the remote fault detection system 300 may be communicated over the network 210 to the vehicle 10. The vehicle 10 may determine, based on the fault, that it is appropriate to stop motion of the vehicle 10 (e.g., to prevent undesirable operations). The fault detection may be communicated to one or more user devices 232 (e.g., over the network 210) to alert operators, drivers, and/or passengers of the vehicle 10 of the presence of the fault condition. The fault detection may also be communicated to one or more user devices 232 associated with the personnel responsible for managing a fleet of the vehicles 10.

A fault detected by the vehicle 10 may be processed by the vehicle 10 to determine, based on the fault, that it is appropriate to stop motion of the vehicle 10 (e.g., to prevent undesirable operations). A fault detected by the vehicle 10 may also be communicated to one or more user devices 232 (e.g., over the network 210) to alert operators, drivers, and/or passengers of the vehicle 10 of the presence of the fault condition. The fault detection may also be communicated to one or more user devices 232 associated with the personnel responsible for managing a fleet of the vehicles 10. The fault may be communicated directly from the vehicle 10 to the user device 232. For example, the fault may be communicated to the user device using the network 210 or short-range communication technologies (e.g., Bluetooth). Additionally or alternatively, the fault detection may be communicated to the remote systems 240 from which the fault detection can be relayed to the user device 232.

As shown in FIG. 5, the remote fault detection system 300 is communicably connected (e.g., via the communications network 210) to one or more user devices 232 and one or more vehicles 10. According to some embodiments, the general configuration of the remote fault detection system 300 is to detect faults associated with the vehicle 10 (e.g., erratic driving, loss of communication, exiting a geofenced area, etc.) and communicate the detection of the fault to the vehicle 10. The remote fault detection system 300 is shown to include one or more processing circuits 302, a communications interface 306, and memory 308. The processing circuits 302 may be configured to execute instructions stored in the memory 308 to perform various operations related to the detection of faults. The communications interface 306 provides communication of information (e.g., detected faults, etc.) to other systems of the fleet monitoring and control system 200. For example, the communications interface may provide text alerts (e.g., via short message service, etc.) to the operators of the vehicle 10 in response to detected faults.

The remote fault detection system 300 is shown to include a remote fault detector 310 and an interface generator 312. The remote fault detector 310 may continually monitor the vehicle 10 for unexpected operational behavior. The unexpected behavior may be related to the location of the vehicle (e.g., from a GPS included in the vehicle 10), the operations of the vehicle (e.g., erratic motion), and/or the internal operations of the vehicle systems (e.g., sensors no longer reporting values). While both the vehicle 10 and the remote fault detection system 300 are capable of detecting similar faults, it is contemplated that the remote fault detection system 300 may have greater computational resources (e.g., multiple processors, GPUs, etc.) making the remote fault detector 310 particularly suitable for executing certain types of fault detection. For example, the remote fault detector 310 may execute dynamic system models of the vehicle 10 and compare the simulated response to telemetry from the vehicle 10 to detect faults.

The interface generator 312 may be configured to provide instructions to the user device 232 (e.g., JavaScript, Cascading Style Sheets, etc.) that instruct the user device 232 how to generate the user interface within a client application (e.g., an internet browser, a proprietary application, etc.). The interface generator 312 may incorporate fault information into a user interface generated by other remote systems 240.

As shown in FIG. 5, the vehicle 10 includes the vehicle control system 100, the sensors 90, the braking system 70, the operator controls 40, the driveline 50, and the suspension system 60. The sensors may include a speed sensor 92 and an IMU 94. The speed sensor 92 may provide measurements of the velocity of the vehicle 10 (e.g., by way of measuring wheel, axle, or prime mover 52 rotational velocity). The IMU 94 may provide measurements of the acceleration or specific forces of the vehicle 10. The braking system 70 may include electromagnetic braking 74 and braking components 76. The braking components 76 may refer to the friction components (e.g., shoe, brake lining, friction material, etc.) that press against a rotor or a drum within a braking system. Electromagnetic braking 74 may provide an alternative method for engaging the braking components 76 or engage alternative braking components 76 (e.g., alternative to mechanical, hydraulic brakes, etc.). In some embodiments, the electromagnetic braking 74 may be used as an emergency brake and/or a parking brake. In some embodiments, the braking system 70 does not include the braking components 76 or the braking components 76 are supplemented by regenerative braking of the prime mover 52.

As shown in FIG. 5, the vehicle 10 includes a fault detector 120, a braking trigger 122, and a vehicle speed controller 130. The general configuration of the vehicle 10 for stopping the vehicle 10 in response to a fault is the fault detector 120 detecting a fault and communicating the detection of the fault to the braking trigger 122. The braking trigger 122 may evaluate (e.g., assess, screen, etc.) the fault to determine if it is appropriate to bring the vehicle 10 to a stop. If the braking trigger 122 determines that the vehicle 10 should be stopped, braking is controlled by the vehicle speed controller 130.

The fault detector 120 may continually monitor the vehicle 10 for unexpected operational behavior. Similar to the remote fault detector 310, the fault detector 120 may detect unexpected behavior related to the location of the vehicle 10 (e.g., from a GPS included in the vehicle 10), the operations of the vehicle 10 (e.g., erratic motion), and/or the internal operations of the vehicle systems (e.g., sensors no longer reporting values). The fault detector 120 of the vehicle 10 may have access to data not available to the remote fault detection system 300 and/or have access to data with less latency than the remote fault detection system 300. The fault detector 120 may be particularly suited for high priority fault detection. For example, the fault detector 120 may be configured to detect unresponsive operator controls 40, faults in the driveline 50, faults in the braking system 70, breakdown of internal communications (e.g., the controller area network (CAN), serial peripheral interfaces (SPI), etc.), and/or other faults in the internal circuitry of the vehicle control system 100 or sensors 90. In some embodiments, the fault detector 120 performs predictive fault detection. The fault detector 120 may monitor conditions indicative of an imminent fault allowing the vehicle 10 to be stopped before the fault occurs.

The braking trigger 122 may evaluate (e.g., assess, screen, etc.) the fault to determine if it is appropriate to bring the vehicle 10 to a stop. Some faults (e.g., unresponsive operator controls 40, etc.) may cause a stop condition that requires the vehicle to be stopped, whereas for other fault conditions it may be more appropriate to allow the vehicle 10 to be operated with the fault until maintenance is performed. In some embodiments, the braking trigger 122 may determine to stop the vehicle 10 based on the fault that occurred. For example, the braking trigger 122 may include a listing of all faults that the fault detector 120 or the remote fault detector 310 are configured to detect with an indication if it is appropriate to stop the vehicle 10 in response to the respective fault. Additionally or alternatively, the braking trigger 122 may determine to stop the vehicle 10 based on the vehicle system affected by the fault. For example, faults related to the sensors 90, the braking system 70, and the operator controls 40 may be considered more severe and the braking trigger 122 may cause the vehicle 10 to be stopped.

More than one fault may occur or be present simultaneously. The braking trigger 122 may evaluate the faults in combination and/or the number of faults to determine if the vehicle 10 is to be stopped. Multiple faults may be indicative of a greater (e.g., more severe, more pervasive, etc.) fault condition that may spread to higher priority systems. The braking trigger 122 may cause the vehicle 10 to stop if there are a number of faults present (e.g., 3, 4, etc.) even if individually none of the faults justify stopping the vehicle 10. In some embodiments, the braking trigger 122 uses a mathematical equation (e.g., function, mapping, etc.) to determine if the vehicle 10 is to be stopped. The braking trigger 122 may compute a weighted sum of the faults (e.g., weighted by priority, severity, or potential consequences) and compare the weighted sum to a severity threshold. The braking trigger 122 may execute a neural network or other fitting function trained with a training set including the fault combinations and if stopping the vehicle 10 was recommended for the fault combination. In some embodiments, the functionality of the fault detector 120 and the braking trigger 122 may be combined. For example, a single neural network can be used to detect the fault and to determine if the vehicle 10 should be stopped.

As shown in FIG. 5, the vehicle speed controller 130 includes a speed and/or acceleration estimator 132, a braking target generator 134, a pitch estimator 136, a pitch compensator 138, and a braking pulse generator 140. The vehicle speed controller 130 may be configured to control the speed of the vehicle 10 under certain conditions. For example, the vehicle speed controller 130 may perform a controlled deceleration to a stop responsive to a detected fault. Responsive to a fault, the electromagnetic braking 74 may be deployed or engaged. It may not be possible to modulate the pressure of the electromagnetic brakes 74 (e.g., the brakes may be either fully engaged or fully released); however, if brakes remain fully engaged the vehicle 10 may decelerate rapidly. The deceleration of the vehicle 10 may be more rapid than that of the driver, passengers, and/or unsecured belongings causing the same to lurch forward relative to the vehicle 10. Advantageously, the electromagnetic brakes 74 may be pulsed (e.g., engaged for a first time duration and disengaged for a second time duration) such that the average deceleration of the vehicle 10 is less than a threshold. The threshold may be based on the amount of deceleration the friction of the vehicle seats and/or other surfaces can impart on the objects and/or people resting on them.

In some embodiments, the general configuration of the vehicle speed controller 130 during a controlled braking is to generate a speed and/or acceleration target (e.g., by the braking target generator 134), begin braking by generating a pulse signal (e.g., by the braking pulse generator 140) that engages and disengages the electromagnetic braking system 10, and adjusting the timing of the pulse signal based on at least one of (i) feedback from the speed sensor 92 and/or the IMU 94 as processed by the speed and/or acceleration estimator 132 or (ii) a pitch (e.g., grade, etc.) of a slope that the vehicle 10 is traversing as estimated by the pitch estimator 136 using measurements from the IMU 94.

The speed and/or acceleration estimator 132 may be configured to estimate the speed and/or acceleration of the vehicle 10 based on measurements from one or more sensors 90 (e.g., the speed sensor 92, the IMU 94, etc.). The speed and/or acceleration estimator 132 may be configured to estimate the speed of the vehicle 10 from a sensor that directly measures accelerations (e.g., the IMU 94) and/or estimate the acceleration of the vehicle 10 from a sensor that directly measures the speed (e.g., the speed sensor 92). Additionally or alternatively, the speed and/or acceleration estimator 132 may be configured to process (e.g., filter, perform noise reduction, reduce bias, etc.) the measurements from the speed sensor 92 and/or the IMU 94 during the process of estimating the speed and/or acceleration.

To determine an acceleration from a speed measurement, the speed and/or acceleration estimator 132 may use a finite difference calculation:

$$a_k = \frac{1}{\Delta t}(v_k - v_{k-1})$$

where $a_k$ is the acceleration of the vehicle 10 estimate by the speed and/or acceleration estimator 132, $v_k$ is the velocity (e.g., speed) of the vehicle 10 as measured by the speed sensor 92, and $\Delta t$ is the time difference between the samples $v_k$ and $v_{k-1}$. The speed sensor 92 may be wheel or axle based and the speed and/or acceleration estimator 132 may be configured to average more than one speed sensor to determine the speed used to calculate the acceleration. Additionally or alternatively, the speed and/or acceleration estimator 132 may be configured to determine a wheel slip condition and avoid using measurements that are associated with a wheel slip condition. For example, wheel slip can be determined by comparing the speed measured at each wheel (an outlier may be indicative of a wheel slipping) and/or by determining that the acceleration dropped faster than possible.

In some embodiments, the speed and/or acceleration estimator 132 may be configured to perform linear regression on a number of speed measurements. If $\Delta t$ is small enough, the delay in acquiring multiple sensor measurements may not be significant. For example, the speed and/or acceleration estimator 132 may fit the function:

$$v(t) = at + v_0$$

to the number of speed measurements by finding fit parameters for the acceleration and the initial velocity. The speed and/or acceleration estimator 132 may use the acceleration obtained from the fit function directly as the estimate of acceleration or use the velocity trajectory v(t) found by regression to identify outliers in the velocity measurement that may be ignored before recalculating an estimated acceleration. Additionally or alternatively, the velocity trajectory v(t) may be used to determine a current estimate (e.g., smoothed estimate) of the speed by calculating the velocity with a current value for the time, t.

The speed and/or acceleration estimator 132 may be configured to estimate the acceleration from one or more acceleration measurements from the IMU 94. For example, a number of acceleration measurements may be averaged or otherwise filtered (e.g., using a finite impulse response filter or an infinite impulse response filter) in order to reduce the noise that may be present in an acceleration measurement.

The speed and/or acceleration estimator 132 may be configured to estimate the speed of the vehicle 10 using one or more acceleration measurements from the IMU 94. The speed and/or acceleration estimator 132 may be configured to estimate the speed of the vehicle 10 by summing accelerations of the vehicle 10. For example, rectangular integration:

$$v_k = v_0 + \sum_{i=0}^{k} \Delta t_i a_i$$

where $\Delta t_i$ is pulled into the integral in the event that a measurement of acceleration is ignored (e.g., because it is an outlier, etc.), trapezoidal integration, or any other integration technique suitable for estimating velocity from acceleration measurements. It is noted that integrating the acceleration measurement to obtain velocity may cause accumulating errors and uses an initial velocity as shown in the above equation. However, the time period over which deceleration occurs while stopping the vehicle 10 may be short enough that cumulative acceleration error is insignificant. In addition, a target velocity during controlled braking may be relative to the initial velocity (e.g., when the fault is detected or when braking begins) allowing the initial velocity in the above equation to be set to zero or set to the velocity at the time the fault occurred in some calculations. In some embodiments, the speed and/or acceleration estimator 132 will use the speed sensor 92 as the primary measurement of speed, but may begin using the IMU 94 to estimate or verify the speed if the speed sensor 92 is faulty (e.g., has failed, is providing erroneous measurements, etc.)

In some embodiments, the speed and/or acceleration estimator 132 ignores the measurements from the IMU 94 during an acceleration or deceleration (e.g., during braking when the weight of the vehicle 10 may shift forward). Rotational forces (e.g., weight shift) during deceleration may affect the measurements from the IMU 94 leading to inaccurate estimation of the pitch if such measurements are used. The speed and/or acceleration estimator 132 may monitor inputs of the vehicle control system 100 (e.g. accelerator or brake commands) and ignore pitch measurements while commands known to affect the measurement are applied and, in some embodiments, for a short time (e.g., a transient time or until the transient effect of stopping the command decay) after the commands are applied. For example, during pulse braking the speed and/or acceleration estimator 132 may only use measurements from the IMU 94 when the brake has been released.

Figure 6A:
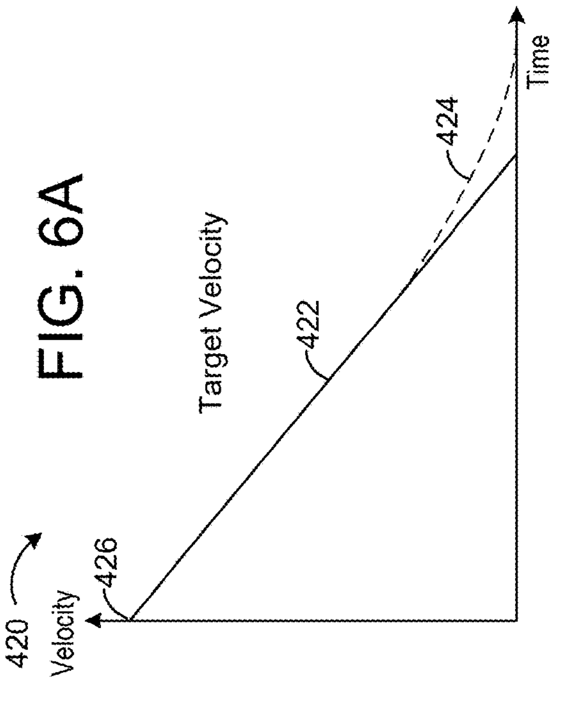
FIG. 6A is a plot of a target velocity under deceleration, according to an exemplary embodiment.

The braking target generator 134 may generate a target velocity and/or target deceleration to bring the vehicle 10 to a controlled stop. As shown in FIG. 6A, a plot 420 of the target velocity may be a linear decrease (e.g., a constant deceleration) with slope less negative than a deceleration threshold (e.g., target velocity 422). The deceleration threshold may be based on the amount of deceleration the friction of the vehicle seats and/or other surfaces can impart on the objects and/or people resting on them (e.g., so that the driver and passengers do not lurch forward relative to the vehicle 10). The target velocity 422 or 424 may start with initial velocity 426 equal to the current velocity of the vehicle 10 at the time the fault is detected or the time that braking is initiated. Other forms (e.g., functions, equations, plots, etc.) of the target velocity may be used. For example, the deceleration may be decreased at low speeds to smooth the stop, as shown in target velocity 424.

The braking pulse generator 140 may be configured to generate a pulse signal that may be applied by the braking system 70. Responsive to a fault, the electromagnetic braking 74 may be deployed, activated, or engaged. It may not be possible to modulate the pressure of the electromagnetic braking 74 (e.g., the brakes may be either fully engaged or fully released); however, if brakes remain fully engaged the vehicle 10 may decelerate rapidly. The deceleration of the vehicle 10 may be more rapid than that of the driver, passengers, and/or unsecured belongings causing the same to lurch forward relative to the vehicle 10. The braking pulse generator 140 may generate a pulse signal, that when applied by the braking system 70, causes the braking components 76 to be engaged (e.g., decelerating the vehicle 10) for a first time duration and disengaged for a second time duration. A pulse period made up of the first time duration and the second time duration may be repeated to gradually decelerate the vehicle 10.

Pulsing the brake components 76 with a pulse signal where the electromagnetic braking 74 is engaged for a first time duration of a period and disengaged for a second time duration of the period may cause the vehicle 10 to decelerate slower (e.g., more gradually, smoother, etc.) than if the brakes components 76 remained fully engaged. To change the deceleration of the vehicle 10 (e.g., during stopping), the braking pulse generator 140 may change the timing of the pulse signal. For example, to increase deceleration the braking pulse generator 140 may increase the ratio (e.g., fraction) of the first time duration (e.g., where the brake components 76 are engaged) relative to the period. To decrease deceleration the braking pulse generator 140 may increase the ratio of the second time duration (e.g., where the brake components 76 are released) relative to the period.

Figure 6B:
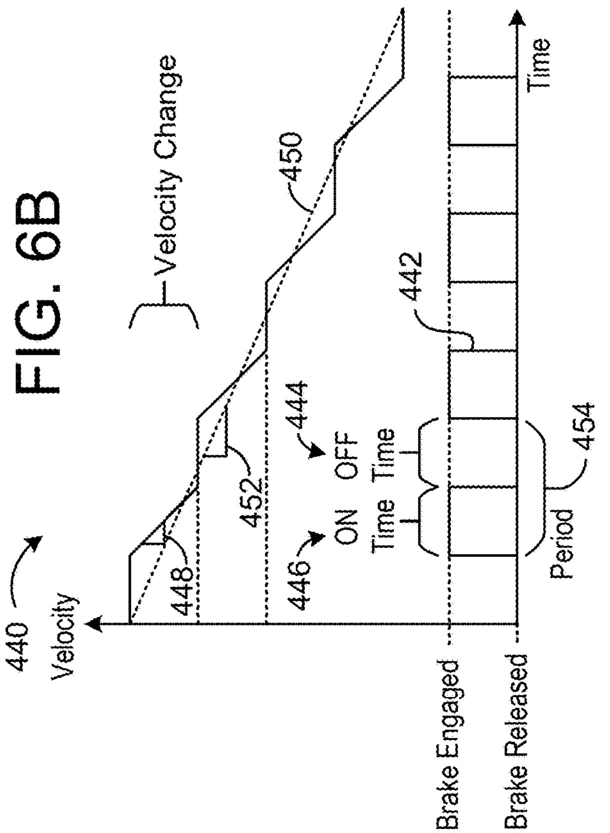
FIG. 6B is a plot of a pulse brake signal with a consistent amount of time the brake is engaged and a consistent amount of time the brake is released, according to an exemplary embodiment.

FIG. 6B shows a plot 440 of the velocity of the vehicle 10 during pulsed braking. Pulse signal 442 is shown to engage and disengage the brake components 76. During a first time duration 446 of a period 454 when the brake components 76 are engaged the vehicle 10 undergoes a deceleration shown as slope 448. During a second time duration 444 of the period 454 when the brake components are released the vehicle 10 does not decelerate. The resulting average velocity profile 450 has slope 452 (e.g., average deceleration) that is less than the deceleration when the brakes are fully engaged. By properly adjusting the first time duration when the brake components 76 are engaged and the second time period when the brake components 76 are released the vehicle speed controller 130 may cause the vehicle 10 to undergo a smooth stop with an average deceleration less than a threshold deceleration allowing contents, the driver, and passengers of the vehicle 10 to remain in their location relative to the vehicle 10.

Figure 6C:
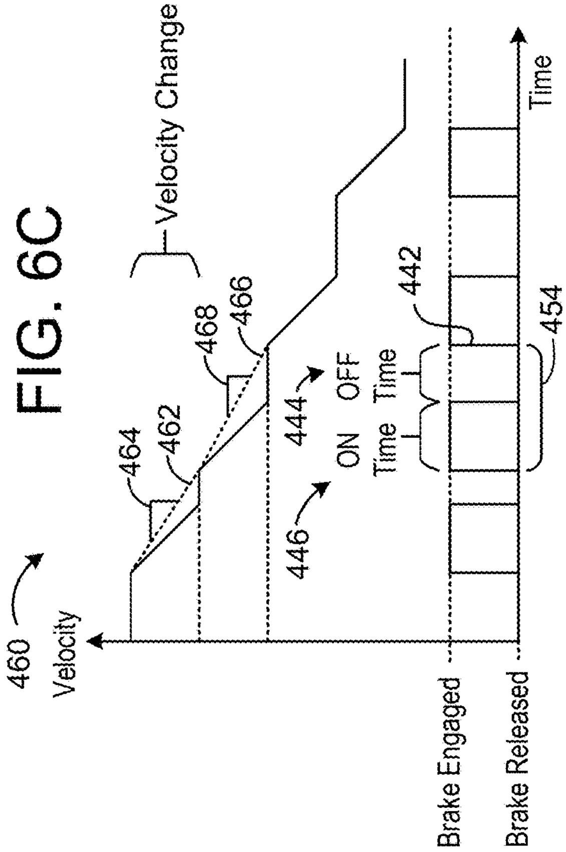
FIG. 6C is a plot of a pulse brake signal with a consistent amount of time the brake is engaged and a variable amount of time the brake is released, according to an exemplary embodiment.

The braking pulse generator 140 may be configured to change the timing of the pulse signal 442 and thus change the vehicle deceleration. For example, the vehicle speed controller 130 may implement a feedback control system and adjust the deceleration if the velocity is not matching the target velocity 422 (e.g., the vehicle 10 is decelerating more or less than expected). FIG. 6C shows a plot 460 of the velocity of the vehicle 10 during pulsed braking where the deceleration is decreased by increasing the length of the second time duration 444 while the first time duration 446 remains constant thereby reducing ratio (e.g., fraction) of the first time duration 446 relative to the period 454. The average velocity profile 462 for a short time duration having the brake components 76 released has greater average deceleration (shown as slope 464) than the average velocity profile 466 for a period 454 having the brake components 76 released for a longer time (e.g., having less average deceleration shown as slope 468).

Figure 6D:
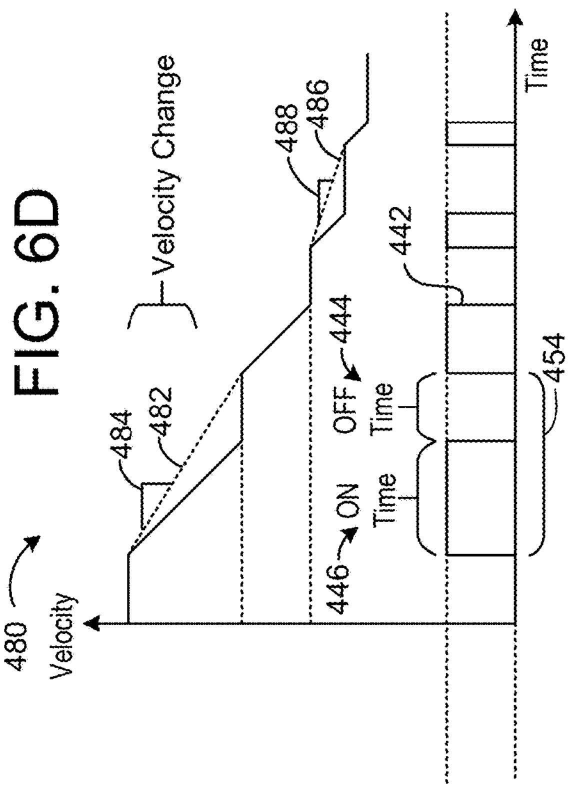
FIG. 6D is a plot of a pulse brake signal with a variable amount of time the brake is engaged and a consistent amount of time the brake is released, according to an exemplary embodiment.

FIG. 6D shows a plot 460 of the velocity of the vehicle 10 during pulsed braking where the deceleration is decreased by decreasing the length of the first time duration 446 while the second time duration 444 remains constant thereby reducing ratio (e.g., fraction) of the first time duration 446 relative to the period 454. The average velocity profile 482 for a long time duration having the brake components 76 engaged has greater average deceleration (shown as slope 484) than the average velocity profile 486 for a period 454 having the brake components 76 engaged for a shorter time (e.g., having less average deceleration shown as slope 488).

Deceleration may also be increased. For example, if the vehicle 10 is moving faster than the target velocity the braking pulse generator 140 may increase deceleration. Deceleration may be increased by increasing the length of the first time duration 446 while the second time duration 444 remains constant thereby increasing the ratio (e.g., fraction) of the first time duration 446 relative to the period 454. Additionally or alternatively, deceleration may be increased by decreasing the length of the second time duration 444 while the first time duration 446 remains constant thereby increasing the ratio (e.g., fraction) of the first time duration 446 relative to the period 454.

In some embodiments, the braking pulse generator 140 is configure to change the timing of the pulse signal 442 by changing both the length of the first time duration where the brake components 76 are engaged and the second time duration where the brake components 76 are released. For example, the duty cycle of the pulse signal 442 may be changed while the period 454 remains constant.

The vehicle speed controller 130 may be configured to compare the velocity (e.g., the speed) of the vehicle 10 to the target velocity 422. The velocity may be acquired using measurements from the speed sensor 92 and/or the IMU 94 as described previously. Based on the comparison (e.g., the difference) between the target velocity at the current time and the measured (or estimated) velocity, the braking pulse generator 140 may adjust the timing of the pulse signal (e.g., increase the ratio or fraction of time the brake components 76 are engaged to increase the deceleration or decrease the ratio of time the brake components 76 are engaged to decrease the deceleration) causing the actual velocity of the vehicle 10 to track (e.g., control to, follow, etc.) the target velocity 422 during stopping.

In some stopping scenarios, the vehicle 10 may be traversing a hill or other sloped surface at the time of the fault. The effect of gravity on the vehicle 10 may cause the vehicle 10 to stop more quickly than expected (e.g., while traversing a slope uphill or with positive grade) or take longer to stop (e.g., while traversing a slope downhill or with negative grade). Additionally, while traversing a slope uphill, gravity may also help keep the contents, driver, and passengers of the vehicle 10 from lurching forward during a stop and the deceleration threshold may be modified so that the vehicle 10 can stop more quickly. Conversely, while traversing a slope downhill, gravity may be pulling the contents, driver, and passengers of the vehicle 10 forward during a stop and the deceleration threshold may be modified so that the vehicle 10 stops more gradually.

The pitch estimator 136 may be configured to estimate the pitch (e.g., the grade) of a slope that the vehicle 10 is traversing so that the pitch can be used in the overall control strategy to bring the vehicle 10 to a controlled stop. The pitch estimator 136 may use acceleration measurements from the IMU 94. For example, the IMU 94 may provide specific force (e.g., acceleration of the IMU 194 relative to a free fall) along 3 axes. The pitch estimator 136 may use the ratio of the specific force along the longitudinal axis and the vertical axis to determine the grade of a slope. Alternatively or additionally, gyroscopes of the IMU 94 may measure an angular rate of motion (e.g., a rate of pitch) of the vehicle 10, which may be tracked by the pitch estimator 136 to determine the current slope of the vehicle 10. Both measurements may be combined to advantageously cancel out dynamic effects affecting the specific force measurements while the vehicle 10 is undergoing acceleration and/or deceleration. In some embodiments, the pitch estimator 136 ignores the measurements from the IMU 94 during an acceleration or deceleration (e.g., during braking when the weight of the vehicle 10 may shift forward). Rotational forces (e.g., weight shift) during deceleration may affect the measurements from the IMU 94 leading to inaccurate estimation of the pitch if such measurements are used. The pitch estimator 136 may monitor inputs of the vehicle control system 100 (e.g. accelerator or brake commands) and ignore pitch measurements while commands known to affect the measurement are applied and, in some embodiments, for a short time (e.g., a transient time or until the transient effect of stopping the command decay) after the commands are applied. Additionally or alternatively, the pitch estimator 136 may ignore outputs during time periods where the IMU 94 measures a rotational acceleration.

The pitch compensator 138 may be configured to adjust the timing of the pulse signal 442 based on the pitch estimate. In some embodiments, the pitch compensator 138 is active during any deceleration responsive to a fault. Alternatively, when a fault is detected, the pitch compensator 138 may compare the current pitch estimate to a pitch threshold and adjust the timing of the pulse signal 442 based on the pitch estimate if the pitch exceeds the pitch threshold. The pitch compensator 138 may adjust the timing of the pulse signal 442 based on the pitch estimate using multiple techniques. For example, the vehicle speed controller 130 may be configured to use a feedback control algorithm (e.g., a proportional-integral ("PI") controller or a proportional-integral-derivative ("PID") controller) that uses various parameters to compute the control output (e.g., the pulse signal timing) and the pitch compensator 138 may adjust those parameters based on the pitch estimate. Additionally or alternatively, the pitch compensator 138 may be configured to provide feed forward compensation to be combined with the adjustments based on the error signal between the target velocity and the current velocity measurement.

Figure 7:
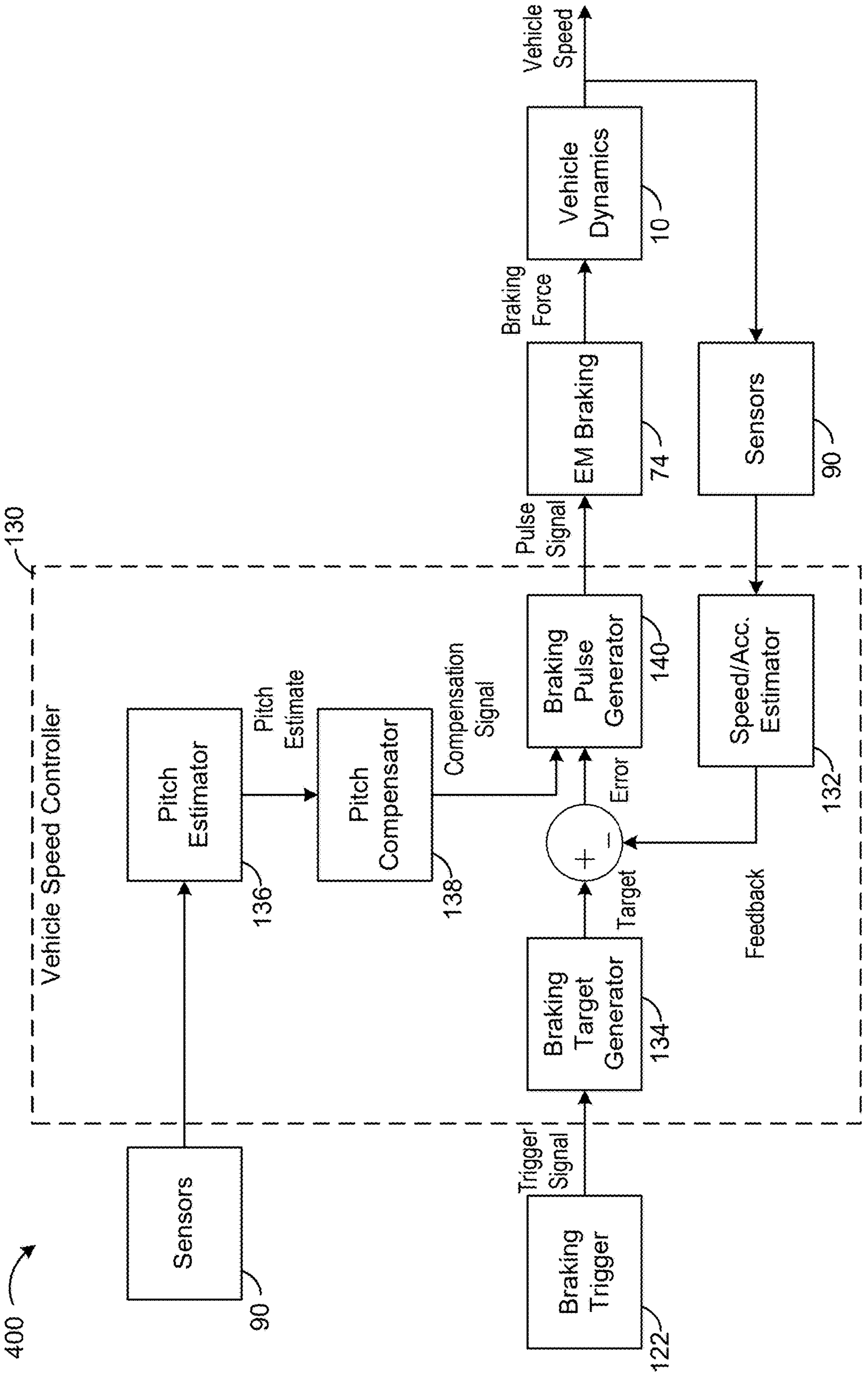
FIG. 7 is a signal flow diagram of a control system for generating a pulsed brake signal based on an inertial measurement unit pitch measurement, according to an exemplary embodiment.

FIG. 7 shows a control strategy 400 of the vehicle control system 100 for generating a pulsed brake signal based on an IMU pitch measurement, according to some embodiments. During vehicle operation, the fault detector 120 and/or the remote fault detector 310 may continually monitor the vehicle 10 for a fault. When a fault is detected, the fault is communicated to the braking trigger 122 for evaluation (e.g., assessment, screening, etc.) to determine if it is appropriate to bring the vehicle 10 to a stop. If the brake trigger 122 is activated, a trigger signal is communicated to the braking target generator 134. The braking target generator 134 may generate a target velocity and/or target deceleration that, if followed, will bring the vehicle 10 to a controlled stop. Additionally, the target velocity may have an average deceleration that is less than a deceleration threshold. A lower deceleration may prevent vehicle contents (e.g., objects, the driver, passengers) from lurching forward relative to the vehicle 10.

The vehicle speed controller 130 may compare the target velocity to the feedback (e.g., estimate of the vehicle velocity) to generate an error signal. The error signal may be used by the braking pulse generator 140 to determine parameters of the pulse signal communicated to the electromagnetic braking 74. For example, the braking pulse generator 140 may implement PI or PID control to convert the error signal to a pulse signal parameter. The braking pulse generator 140 may also receive a pitch estimate from the pitch compensator 138.

In some embodiments, the sensors 90 provide measurements (e.g., the specific force) that can be used by the pitch estimator 136 to determine an estimate of the pitch of the surface the vehicle 10 is traversing. The pitch compensator 138 may use the pitch estimate to determine a compensation signal (e.g., an adjustment or change to the parameters of the pulse signal) that can also be used by the braking pulse generator 140 during signal generation.

The pulse signal is applied to the electromagnetic braking 74 to alternate engagement and release of the brake components 76. For example, the brake components 76 may be engaged during a first time duration of a pulse period and released during a second time duration of the pulse period. Over the period the electromagnetic braking 74 may produce an average braking force exerted on the vehicle 10 to bring the vehicle 10 to a stop. The vehicle speed may be estimated or determined using the sensors 90, for example, the vehicle speed may be estimated or determined using the speed sensor 92 and/or the IMU 94. In some embodiments, the control of the vehicle speed is performed using measurements acquired from the speed sensor 92 when it is available; however, the IMU 94 may provide the measurements to produce the speed estimate if the speed sensor 92 is not available (e.g., not installed, failed, in a fault condition, etc.). Feedback may be generated by the speed and/or acceleration estimator 132 completing the feedback control loop.

The vehicle speed controller 130 may continue to compare the velocity feedback to the target velocity at the current time while adjusting the parameters of the pulse signal to cause the vehicle velocity to track the target from the braking target generator 134. In some embodiments, when the actual vehicle velocity is less than a velocity threshold, the vehicle speed controller 130 may cease pulsing the electromagnetic braking 74 and engage the brake components 76 consistently (e.g., until the fault is acknowledged, repair is performed, etc.).

Figure 8:
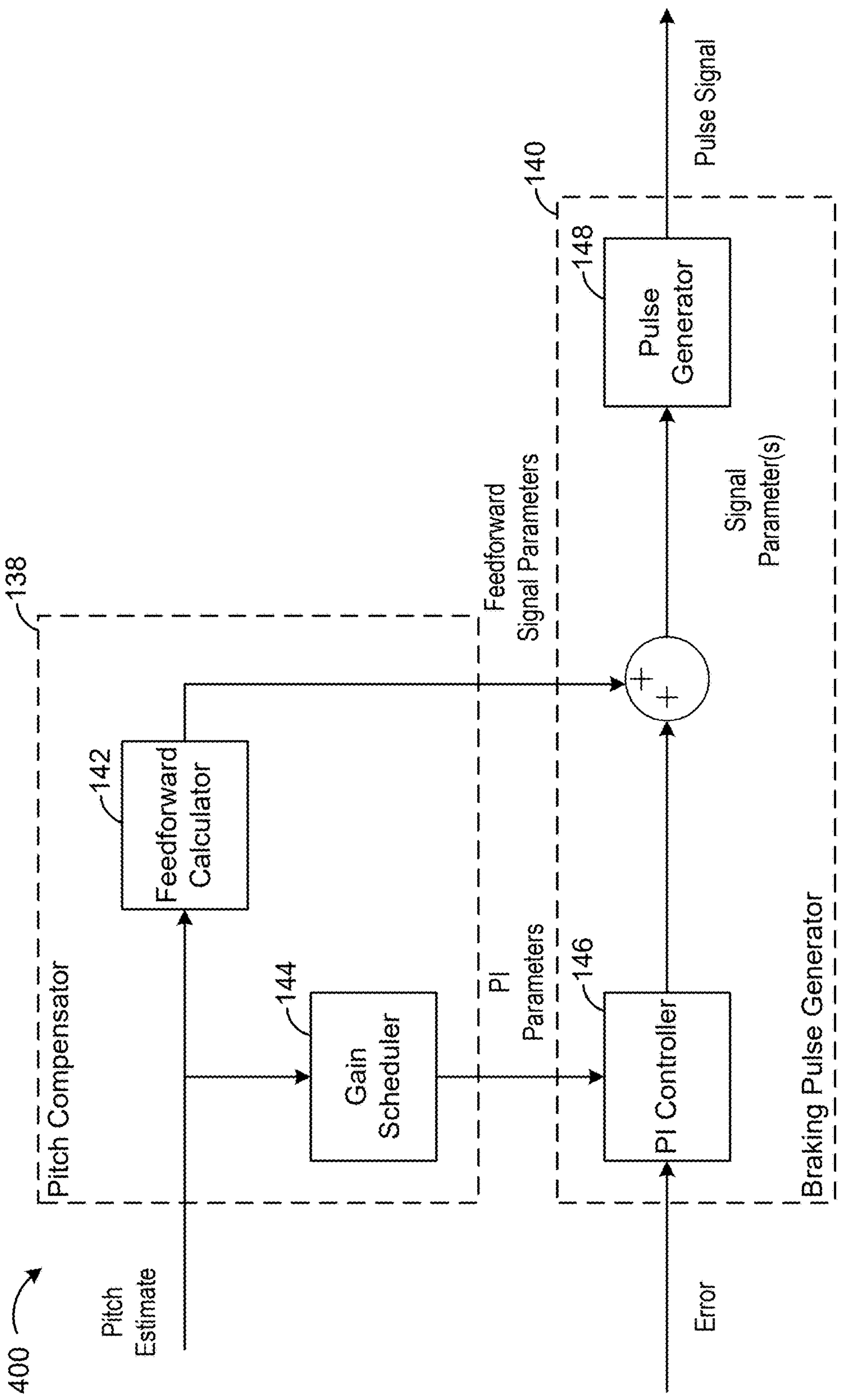
FIG. 8 is a signal flow diagram of a portion of the control system for generating a pulsed brake signal based on the inertial measurement unit pitch measurement of FIG. 7, according to an exemplary embodiment.

FIG. 8 shows a detailed view of the control strategy 400 including internal components of the pitch compensator 138 and the braking pulse generator 140. The braking pulse generator 140 is shown to include a PI controller 146 and pulse generator 148. In some embodiments, an alternative control algorithm (e.g., a PID controller, a lookup table, etc.) is used in place of the PI controller 146. The PI controller 146 may be configured to process the error function to generate parameters of the pulse signal to be applied to the electromagnetic braking 74. The output of the PI controller 146 may be a brake activation level. The PI controller 146 may modulate the brake activation level according to the error signal, increasing the activation level if the target velocity is less than the feedback estimate (e.g., negative error) and decreasing the activation level if the target velocity is higher than the feedback estimate (e.g., positive error). The brake activation level may include at least one of the duty cycle of the pulse signal, the length of a first duration where the brake components 76 are engaged, or the length of a second duration where the brake components 76 are released.

The pulse generator 148 may be configured to produce a pulse signal according to the signal parameters input. The pulse generator 148 may cause the processing circuit 102 to produce a pulse signal at an analog output, a pulse width modulated output, and/or a general-purpose binary output of a microcontroller or microprocessor. The pulse signal may be conditioned by additional circuitry of the vehicle control system 100 or the braking system 70 to have a voltage and capability to supply the power required by the braking components 76.

As shown in FIG. 8, the pitch compensator 138 includes a feedforward calculator 142 and a gain scheduler 144, according to some embodiments. The feedforward calculator 142 may provide an offset to the signal parameters based on the pitch estimate. The feedforward calculator 142 may include a function (e.g., lookup table, operation, etc.) that maps the pitch estimate to a feedforward signal parameter (e.g., a change, adjustment, etc.) that is added to the output of the PI controller 146. In some embodiments, the feedforward calculator 142 is configured to estimate the longitudinal force on the vehicle 10 due to gravity based on the pitch estimate and generate a feedforward signal parameter that compensates for the gravitational force. For example, the longitudinal force due to gravity may be calculated by:

$$F_l = w \cdot \sin(\theta) = w \cdot \sin(\tan^{-1} g),$$

where θ is the angle of the slope, g is the grade of the slope and w is the weight of the vehicle. To calculate a parameter adjustment that can compensate for the longitudinal force the feedforward calculator 142 may adjust the duty cycle, d, of the pulse signal by an amount based on the braking force of the brake components 76 when engaged, $F_{brake}$, as in:

$$\Delta d = -\frac{F_l}{F_{brake}}.$$

In some embodiments, the gain scheduler 144 is configured to adjust the parameters of the PI controller 146 based on the pitch estimate. The gain scheduler 144 may include a function (e.g., lookup table, operation, etc.) that maps the pitch estimate to one or more control algorithm parameters (e.g., proportional gain, integral time, etc.). For example, the gain scheduler 144 may communicate more aggressive control parameters to the PI controller if the vehicle 10 is traversing a slope with negative grade (e.g., downhill).

In some embodiments, the target and feedback signals are decelerations signals. The target deceleration may be constant value (e.g., to produce vehicle behavior similar to that of the target velocity 422) or the target deceleration may be constant for a period of time before decaying towards zero (e.g., to produce vehicle behavior similar to that of the target velocity 424). If deceleration targets are used instead of target velocities, the speed and/or acceleration estimator 132 may be configured to estimate the acceleration of the vehicle 10 as described previously. To convert an error signal that is in units of acceleration the parameters of the PI controller may be converted, for example, to units of $s^2/m$ rather than s/m. In some embodiments, the vehicle speed controller 130 operates in terms of vehicle speed if the speed sensor 92 is being used to calculate the feedback and operates in terms of acceleration if the IMU 94 is used to calculate the feedback. The vehicle speed controller 130 may switch to using acceleration feedback from the IMU 94 in response to a failure of the speed sensor 92 parameters of the gain scheduler 144 and the PI controller 146 may be updated at the same time (e.g., within the same sampler period of the control algorithm, PI controller, etc.) to offer a smooth switch to acceleration-based feedback.

Figure 9:
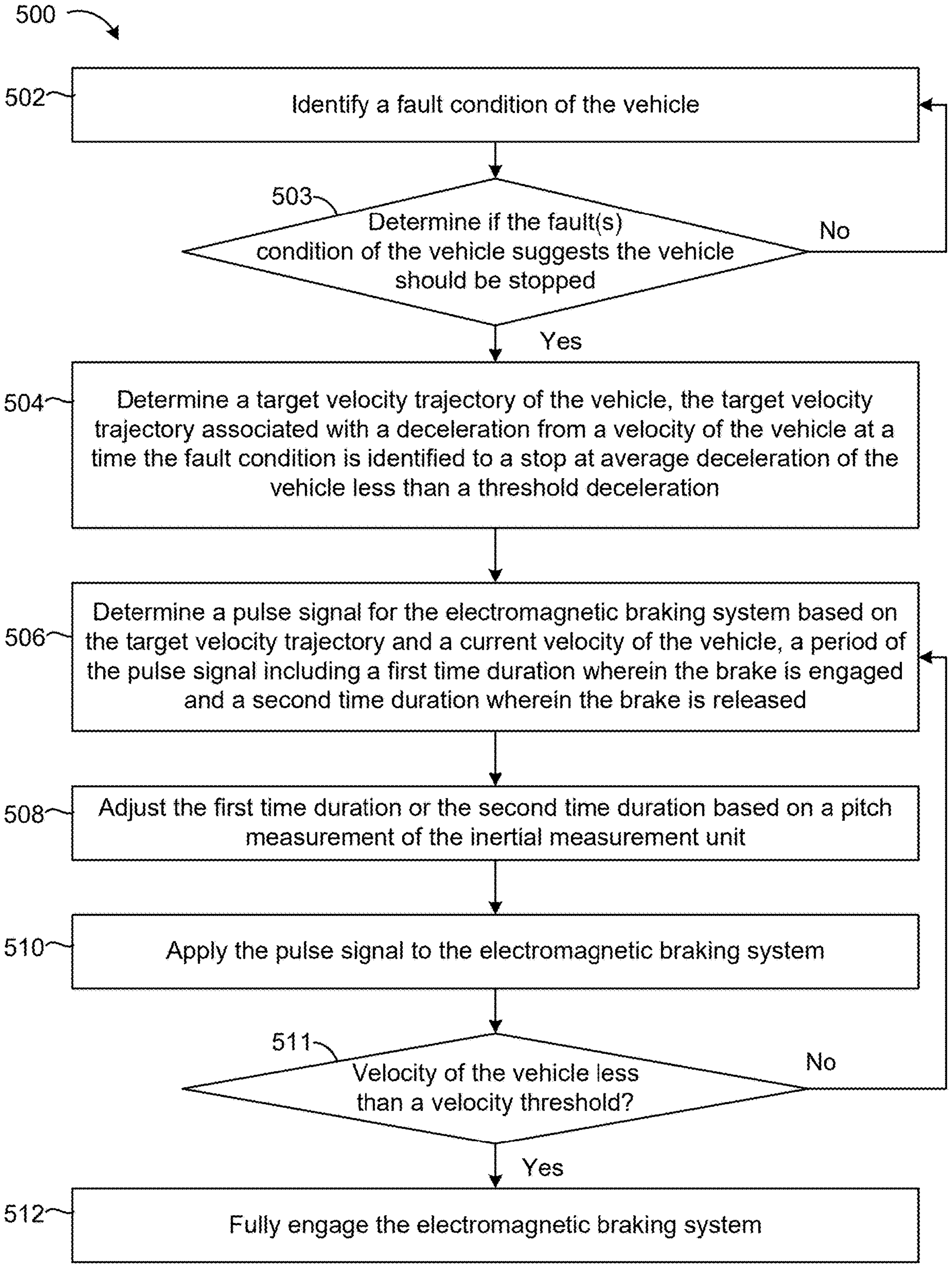
FIG. 9 is a flow diagram of a method for performing pulsed brake stopping of a vehicle responsive to a fault of the vehicle, according to an exemplary embodiment.

FIG. 9 shows a method 500 for bringing the vehicle 10 to a controlled stop responsive to a fault, according to some embodiments. The method 500 may include identifying a fault condition of the vehicle 10 in operation 502. The fault detector 120 and/or the remote fault detector 310 may continually monitor the vehicle 10 for unexpected operational behavior. Either fault detector may detect unexpected behavior related to the location of the vehicle 10 (e.g., from a GPS included in the vehicle 10), the operations of the vehicle 10 (e.g., erratic motion), and/or the internal operations of the vehicle systems (e.g., sensors no longer reporting values). For example, the fault detector 120 and/or the remote fault detector 310 may be configured to detect unresponsive operator controls 40, faults in the driveline 50, faults in the braking system 70, breakdown of internal communications (e.g., the CAN, SPI, etc.), and/or other faults in the internal circuitry of the vehicle control system 100 or sensors 90. In some embodiments, the fault detector 120 and/or the remote fault detector 310 simulate performance of the vehicle 10 and compare the simulation to the actual vehicle performance. A fault may be declared (e.g., detected) if the simulation and actual performance do not satisfy a similarity metric. In some embodiments, the fault detector 120 and/or the remote fault detector 310 performs predictive fault detection. Conditions indicative of an imminent fault may be monitored allowing the vehicle 10 to be stopped before the fault occurs.

The method 500 may include determining if the fault condition of the vehicle 10 suggests (e.g., warrants, necessitates, justifies, etc.) that the vehicle 10 should be stopped in operation 503. If the fault does not suggest that vehicle 10 should be stopped, the method 500 continues back to monitoring for additional faults in the operation 502. If the fault condition of the vehicle 10 suggests that the vehicle 10 should be stopped, the method 500 continues to operation 504. The braking trigger 122 may perform operation 503. The braking trigger 122 may include a listing of all faults that the fault detector 120 or the remote fault detector 310 are configured to detect including an indication if it is appropriate to stop the vehicle 10 in response to the respective fault. Additionally or alternatively the braking trigger 122 may determine to stop the vehicle 10 based on the vehicle system affected by the fault. In some embodiments, the braking trigger 122 considers more than one fault condition present at the same time. For example, the braking trigger 122 may compare the number of fault conditions to a threshold number.

The method 500 may include determining a target velocity trajectory of the vehicle 10, the target velocity trajectory associated with a deceleration from a velocity of the vehicle 10 at a time the fault condition is identified to a stop at average deceleration of the vehicle 10 less than a threshold deceleration in operation 504. The braking target generator 134 may generate a target velocity and/or target acceleration to bring the vehicle 10 to a controlled stop. The target velocity 422 or 424 shown in the plot 420 of FIG. 6A may be determined for comparison to the actual velocity under braking. The target velocity may be, for example, a linear decrease (e.g., a constant deceleration) with slope less negative than a deceleration threshold. The deceleration threshold may be based on the amount of deceleration the friction of the vehicle seats and/or other surfaces can impart on the objects and/or people resting on them (e.g., so that the driver and passengers do not lurch forward relative to the vehicle 10).

The method 500 may include determining a pulse signal for the electromagnetic braking system based on the target velocity trajectory and a current velocity of the vehicle 10 in operation 506. A period of the pulse signal may include a first time duration where the brake is engaged and a second time duration where the brake is released. A pulse signal substantially similar to any of the pulse signal shown in FIGS. 6B-6D may be determined (and generated) by the braking pulse generator 140. The pulse signal may be generated one or more periods at a time (e.g., with timing adjustments possibly occurring with each period). For example, the control strategy 400 shown in FIGS. 7 and 8 may be implemented to determine and generate a pulse signal based on the target velocity and on the current velocity.

The method 500 may include adjusting the first time duration or the second time duration based on a pitch measurement of the inertial measurement unit in operation 508. For example, by adjusting the first time duration and/or the second time duration the ratio (e.g., fraction) of time the brake components 76 are engaged may be modulated causing a change in the average braking force created by the brakes. The average braking force may be adjusted to account for the additional force of gravity exerted on a vehicle traversing a slope. The average braking force may be increased for the vehicle 10 when moving downhill or decreased for the vehicle 10 when moving uphill. The pitch measurement may be determined by the pitch estimator 136 using measurements from the IMU 94 and used as feed forward control and/or to perform gain scheduling causing the braking control system to account for the disturbance of a slope more quickly. The pitch compensator 138 may provide adjustments by way of PI parameters and/or feed-forward signals as shown in the control strategy 400 shown in FIGS. 7 and 8.

The method 500 may include applying the pulse signal to the electromagnetic braking system 74 in operation 510. For example, the pulse generator 148 may cause the processing circuit 102 to produce a pulse signal at an analog output, a pulse width modulated output, and/or a general-purpose binary output of a microcontroller or microprocessor. The pulse signal may be conditioned by additional circuitry of the vehicle control system 100 or the braking system 70 to have a voltage and capability to supply the power required by the braking components 76.

The method 500 may include determining if the velocity of the vehicle 10 is less than a velocity threshold in operation 511. If the velocity of the vehicle 10 is not less than the velocity threshold, the method 500 may repeat operations 506-511 by continuing to determine new parameters for the pulse signal and applying that pulse signal to the electromagnetic braking system 76 so that the velocity of the vehicle 10 tracks the target velocity. If the velocity of the vehicle 10 is less than the velocity threshold, the method 500 may fully engage the electromechanical braking system in operation 512. The conditional check of the operation 511 ensures that the vehicle 10 does not fully (e.g., consistently, etc.) engage the brake components 76 until the speed is low enough such that objects and/or occupants of the vehicle 10 do not lurch forward relative to the vehicle 10 during the final stop.

In some embodiments, if both the speed sensor 92 and the IMU 94 are faulty, the pulse signal is generated in open loop. For example, the pulsing may be performed with a fixed period, fixed first time duration where the brake components 76 are engaged, and a fixed second time duration where the brake components 76 are released. Open loop pulsing may be performed for a fixed amount of time before the electromagnetic braking system 74 is fully engaged. The nature of the fault may be such that no pulsing can be performed and the electromagnetic braking system 74 is fully engaged.

While many of the systems and methods were describe here in as related to electromagnetic braking systems, the present application contemplates other types of brakes (e.g., hydraulic brakes, pneumatic brakes, mechanical brakes, regenerative brakes) for which pulsing the application of such other types of brakes may be advantageous in the scenarios described.

The words “speed” and “velocity” are herein used interchangeably except where context requires the directionality implied by velocity.

As utilized herein with respect to numerical ranges, the terms “approximately,” “about,” “substantially,” and similar terms generally mean±/−10% of the disclosed values, unless specified otherwise. As utilized herein with respect to structural features (e.g., to describe shape, size, orientation, direction, relative position, etc.), the terms “approximately,” “about,” “substantially,” and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.) and the fleet monitoring and control system 200 (e.g., the remote systems 240, the user portal 230, the user sensors 220, etc.) as shown in the various exemplary embodiments is illustrative only. Additionally, any element disclosed in one embodiment may be incorporated or utilized with any other embodiment disclosed herein.

The invention claimed is:

1. A recreational vehicle comprising:

an electromagnetic braking system comprising a brake;

an inertial measurement unit; and a vehicle controller configured to:

identify a fault condition of the recreational vehicle;

determine a target velocity trajectory of the recreational vehicle, the target velocity trajectory associated with a deceleration from a velocity of the recreational vehicle at a time the fault condition is identified to a stop at an average deceleration of the recreational vehicle less than a threshold deceleration;

determine a pulse signal for the electromagnetic braking system based on the target velocity trajectory and a current velocity of the recreational vehicle, a period of the pulse signal comprising a first time duration where the brake is engaged and a second time duration where the brake is released;

adjust the first time duration or the second time duration based on a pitch measurement of the inertial measurement unit; and apply the pulse signal to the electromagnetic braking system.

2. The recreational vehicle of claim 1, wherein the vehicle controller is configured to increase a fraction of the period represented by the first time duration responsive to the pitch measurement indicating the recreational vehicle is moving downhill.

3. The recreational vehicle of claim 2, wherein the vehicle controller is configured to increase a length of the first time duration or decrease a length of the second time duration responsive to the pitch measurement indicating the recreational vehicle is moving downhill.

4. The recreational vehicle of claim 1, wherein the vehicle controller is configured to increase a fraction of the period represented by the second time duration responsive to the pitch measurement indicating the recreational vehicle is moving uphill.

5. The recreational vehicle of claim 4, wherein the vehicle controller is configured to increase a length of the second time duration or decrease a length of the first time duration responsive to the pitch measurement indicating the recreational vehicle is moving uphill.

6. The recreational vehicle of claim 1, wherein the vehicle controller is configured to acquire the current velocity of the recreational vehicle based on measurements from the inertial measurement unit.

7. The recreational vehicle of claim 6, wherein the vehicle controller is configured to acquire the current velocity of the recreational vehicle based on measurements from the inertial measurement unit responsive to a failure of a speed sensor.

8. The recreational vehicle of claim 1, wherein determining the pulse signal for the electromagnetic braking system based on the target velocity trajectory and the current velocity of the recreational vehicle comprises executing a feedback control algorithm and adjusting a length of the first time duration or a length of the second time duration comprises adjusting a parameter of the feedback control algorithm.

9. The recreational vehicle of claim 1, wherein determining the pulse signal for the electromagnetic braking system based on the target velocity trajectory and the current velocity of the recreational vehicle comprises executing a feedback control algorithm and adjusting the first time duration or the second time duration comprises adding feedforward compensation to the vehicle controller.

10. The recreational vehicle of claim 9, wherein the feedforward compensation comprises adding a bias term to an average braking force represented by the pulse signal.

11. The recreational vehicle of claim 1, wherein the vehicle controller is configured to adjust the pitch measurement to compensate for weight shift during deceleration.

12. The recreational vehicle of claim 1, wherein the vehicle controller is configured to acquire the pitch measurement after the electromagnetic braking system has been disengaged for greater than a transient time period.

13. The recreational vehicle of claim 1, wherein the vehicle controller is configured to fully engage the electromagnetic braking system when the current velocity of the recreational vehicle is less than a velocity threshold.

14. A vehicle system comprising:

one or more memory devices having instructions stored thereon that, when executed by one or more processors, cause the one or more processors to perform operations comprising:

acquiring at least one of a vehicle velocity measurement or a vehicle pitch measurement using an inertial measurement unit of a recreational vehicle;

identifying a fault condition of the recreational vehicle; and generating a pulse signal for an electromagnetic braking system of the recreational vehicle based on the at least one of the vehicle velocity measurement or the vehicle pitch measurement to cause an average vehicle deceleration of the recreational vehicle during a deceleration time period to be less than or equal to a threshold deceleration in response to the fault condition.

15. The vehicle system of claim 14, the operations further comprising:

determining the average vehicle deceleration over at least one period of the pulse signal using measurements from the inertial measurement unit;

comparing the average vehicle deceleration to a desired deceleration less than or equal to the threshold deceleration; and adjusting the pulse signal based on the comparison.

16. The vehicle system of claim 14, the operations further comprising:

acquiring a recreational vehicle velocity measurement from a speed sensor; and determining a target velocity trajectory of the recreational vehicle, the target velocity trajectory associated with a deceleration from a velocity of the recreational vehicle at a time the fault condition is identified to a stop at the average vehicle deceleration, wherein generating the pulse signal is further based on a comparison between the vehicle velocity measurement from the speed sensor and the target velocity trajectory of the recreational vehicle.

17. The vehicle system of claim 14, the operations further comprising determining a target velocity trajectory of the recreational vehicle, the target velocity trajectory associated with a deceleration from a velocity of the recreational vehicle at a time the fault condition is identified to a stop at the average vehicle deceleration, wherein generating the pulse signal is further based on a comparison between the vehicle velocity measurement acquired using the inertial measurement unit and the target velocity trajectory of the recreational vehicle.

18. The vehicle system of claim 14, wherein a period of the pulse signal comprising a first time duration wherein a brake of the recreational vehicle is engaged and a second time duration wherein the brake is released and generating the pulse signal comprises increasing a fraction of the period represented by the second time duration responsive to the vehicle pitch measurement indicating the recreational vehicle is moving uphill.

19. The vehicle system of claim 14, wherein a period of the pulse signal comprising a first time duration wherein a brake of the recreational vehicle is engaged and a second time duration wherein the brake is released and generating the pulse signal comprises decreasing a fraction of the period represented by the second time duration responsive to the vehicle pitch measurement indicating the recreational vehicle is moving downhill.

20. A vehicle comprising:

an electromagnetic braking system comprising a brake;

a speed sensor;

an inertial measurement unit; and a vehicle controller configured to:

identify a fault condition of the vehicle;

determine a target velocity trajectory of the vehicle, the target velocity trajectory associated with a deceleration from a velocity of the vehicle at a time the fault condition is identified to a stop at an average deceleration of the vehicle less than a threshold deceleration;

acquire a current velocity of the vehicle using the speed sensor;

acquire the current velocity of the vehicle using the inertial measurement unit;

determine a pulse signal for the electromagnetic braking system based on the target velocity trajectory and the current velocity of the vehicle, a period of the pulse signal comprising a first time duration where the brake is engaged and a second time duration where the brake is released;

increase a fraction of the period represented by the first time duration responsive to a pitch measurement of the inertial measurement unit indicating the vehicle is moving downhill;

increase the fraction of the period represented by the second time duration responsive to a pitch measurement of the inertial measurement unit indicating the vehicle is moving uphill; and apply the pulse signal to the electromagnetic braking system.

* * * * *